No. 762,847. PATENTED JUNE 14, 1904.
M. SCHNEIDER.
STORAGE BATTERY.
APPLICATION FILED SEPT. 4, 1903.
NO MODEL.

WITNESSES
Wm. Kuehne
John A. Percival

INVENTOR
Max Schneider
BY Richardson
ATTORNEYS.

No. 762,847.

Patented June 14, 1904.

UNITED STATES PATENT OFFICE.

MAX SCHNEIDER, OF DRESDEN-PLAUEN, GERMANY, ASSIGNOR OF ONE-HALF TO JULIUS BEISBARTH, OF NUREMBERG, GERMANY.

STORAGE BATTERY.

SPECIFICATION forming part of Letters Patent No. 762,847, dated June 14, 1904.

Application filed September 4, 1903. Serial No. 171,954. (No model.)

*To all whom it may concern:*

Be it known that I, MAX SCHNEIDER, manufacturer, of Bienertstrasse No. 17, Dresden-Plauen, Germany, have invented a new and useful Storage Battery, of which the following is a specification.

This invention relates to improvements in storage batteries of that kind in which the positive-pole electrode is formed of a plurality of downwardly-converging ribbed lead cones put one above the other and fastened in the center to a lead core by melting and the negative-pole electrode is formed of a hollow metal cylinder encompassing the positive electrode. The improvements are destined to render the storage battery more effective; and the objects of my improvements are, first, to vertically and radially divide the lead cones and most part of the lead core of the positive-pole electrode into halves or several parts; second, to provide the negative-pole electrode either with one vertical internal partition-wall or with several vertical internal partition-walls crossing each other for engaging in the spaces between the parts of the positive-pole electrode, and, third, to hang the positive-pole electrode on the upper edges of the partition-walls of the negative-pole electrode. I attain these objects by the storage batteries illustrated in the accompanying drawings, in which—

Figure 1:
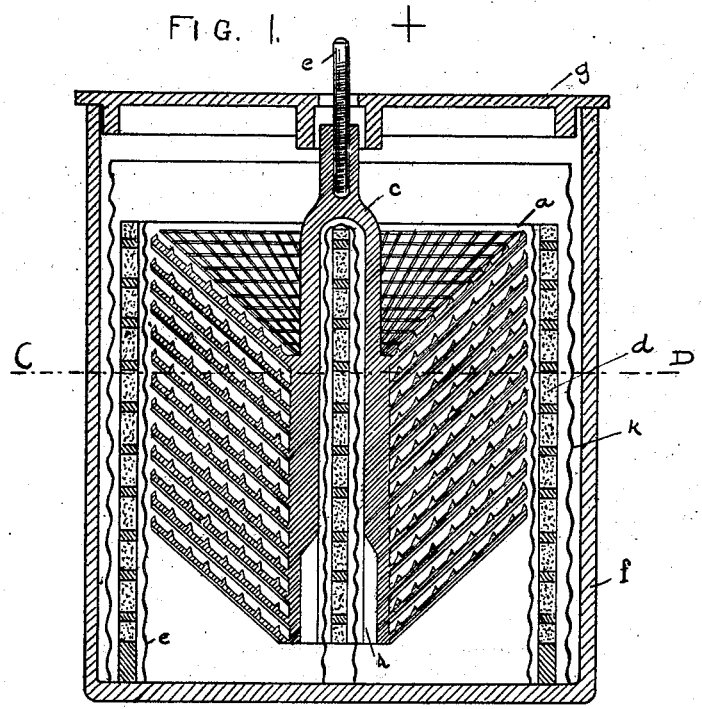
Figure 2:
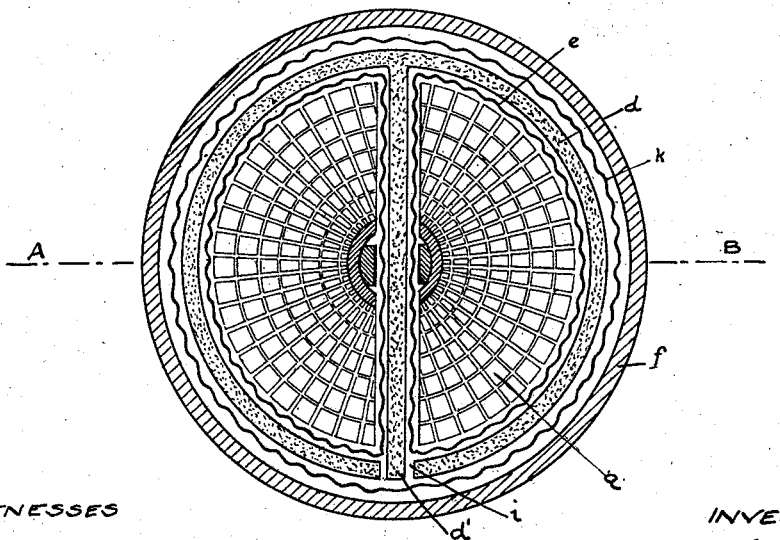

Figure 1 is a vertical section through a storage battery on the line A B in Fig. 2, the positive-pole electrode being divided into halves. Fig. 2 is a horizontal section through the same on the broken line C D in Fig. 1.

Similar letters of reference refer to similar parts throughout both views.

The storage battery comprises a containing vessel $f$ and a cover $g$, of insulating material, and the two electrodes. The positive-pole electrode of a known construction consists of a plurality of downwardly-converging lead cones $a$, provided each on the upper surface with a plurality of radial ribs and a plurality of concentric ribs crossing each other, so as to form a plurality of recesses for receiving the active material. The lead cones $a$ are put one above the other and fastened to a tube-like lead core $b$ by melting. Preferably the several disks $a$ and the core $b$ are entirely divided into halves, so that a vertical central space $h$ is left between them. The two parts of the positive-pole electrode are preferably fastened by melting to a lead fork $c$, as is shown at Figs. 1 and 2. The fork $c$ is provided with a binding-post $e$, projecting through an opening of the cover $g$. The negative-pole electrode $d$, made of metal or active material in a known manner, is in this case slitted vertically at $i$ and provided with a vertical central partition-wall $d'$, extending into the slit $i$, as shown. The negative-pole electrode is placed in the containing vessel $f$ and there secured in a suitable manner. An insulating-body $k$ of any known kind—for example, a fibrous cellulose sheet chemically treated with a neutral salt or the like—is introduced between the containing vessel $f$ and the negative-pole electrode, and equally an insulating-body $l$ of any known kind is made to line the internal walls of the negative-pole electrode. Afterward the positive-pole electrode is so introduced that its fork $c$ rests on the upper edge of the partition-wall $d'$. Where so preferred, the slit $i$ of the negative-pole electrode $d$ may be omitted.

The storage battery described so far can be varied in many respects without deviating from the spirit of my invention.

What I claim as my invention, and desire to secure by Letters Patent, is—

1. In a storage battery, the combination with a containing vessel, of a cover, a positive-pole electrode formed of a plurality of downwardly-converging lead grid-cones put one above the other and fastened by melting to a central lead core, said lead grid-cones and most part of said lead core up to a point near the upper end being vertically divided into halves, a hollow cylinder of active material adapted to form the negative-pole electrode inclosing said positive-pole electrode and provided with one vertical partition-wall engaging in the space between the halves of said positive-pole electrode, and means for insulating said negative-pole electrode from said containing vessel and from said positive-pole electrode.

2. In a storage battery, the combination with a containing vessel, of a cover, a positive-pole electrode formed of a plurality of downwardly-converging lead grid-cones put one above the other and fastened by melting to a central lead core, said lead grid-cones and most part of said lead core up to a point near its upper end being vertically and radially divided into a plurality of parts, a hollow cylinder of active material adapted to form the negative-pole electrode inclosing said positive-pole electrode and provided with a plurality of vertical radial partition-walls engaging in the spaces between the parts of said positive-pole electrode, and means for insulating said negative-pole electrode from said containing vessel and from said positive-pole electrode.

In testimony whereof I have signed my name to this specification in the presence of two subscribing witnesses.

MAX SCHNEIDER.

Witnesses:
   ERNST SCHMATOLLA,
   PAUL ARRAS.